United States Patent [19]
Farr

[11] Patent Number: 4,822,115
[45] Date of Patent: Apr. 18, 1989

[54] VEHICLE ANTI-SKID BRAKING SYSTEMS

[75] Inventor: Glyn P. R. Farr, Warwickshire, England

[73] Assignee: Lucas Industries public limited company, England

[21] Appl. No.: 170,866

[22] Filed: Mar. 21, 1988

Related U.S. Application Data

[62] Division of Ser. No. 936,352, Dec. 1, 1986.

[30] Foreign Application Priority Data

Dec. 3, 1985 [GB] United Kingdom ............... 8529777

[51] Int. Cl.$^4$ ........................... B60T 8/40; B60T 13/70
[52] U.S. Cl. ..................................... 303/116; 188/344; 188/181 A; 303/115; 303/110
[58] Field of Search ............... 303/113, 114, 116, 115, 303/119, 117, 61-63, 68-69, 10-12, 110; 188/344, 181

[56] References Cited

U.S. PATENT DOCUMENTS

| | | | |
|---|---|---|---|
| 4,340,258 | 7/1982 | Farr | 303/115 |
| 4,350,396 | 9/1982 | Mortimer | 303/116 X |
| 4,353,440 | 10/1982 | Farr | 303/116 X |
| 4,421,359 | 12/1983 | Hayashi et al. | 303/116 X |
| 4,457,563 | 7/1984 | Farr | 303/92 |
| 4,465,322 | 8/1984 | Hayashi | 303/116 X |
| 4,474,413 | 10/1984 | Farr | 303/116 |
| 4,648,664 | 3/1987 | Yardley | 303/115 |
| 4,660,683 | 4/1987 | Hayashi et al. | 188/344 X |
| 4,664,233 | 5/1987 | Tsuchida et al. | 303/116 X |
| 4,673,221 | 6/1987 | Hayashi et al. | 188/344 X |
| 4,730,705 | 3/1988 | Farr | 303/116 X |

Primary Examiner—Douglas C. Butler
Attorney, Agent, or Firm—Laff, Whitesel, Conte & Saret

[57] ABSTRACT

In a vehicle anti-skid hydraulic braking system of the pump/re-apply type the pump plunger is of differential outline and works in a stepped bore. An annular chamber and a full pump chamber are defined in the bore on opposite sides of the head of the piston. The annular chamber is pressurized by fluid at a pressure dependent on the difference in pressure between the master cylinder and the brake, and the chamber is subjected to the pressure in the annular chamber in one direction and the pressure in the master cylinder in the opposite direction. The system is therefore provided with a pump which forces fluid back to the master cylinder but with torque levels similar to a pump which acts against brake pressure.

5 Claims, 6 Drawing Sheets

VEHICLE ANTI-SKID BRAKING SYSTEMS

This application is a division, of prior application Ser. No. 06/936,352 filed Dec. 1, 1986.

This invention relates to vehicle anti-skid braking systems of the kind in which a supply of operating fluid from a supply, suitably a master cylinder, to a vehicle wheel brake is modulated by a modulator assembly in accordance with skid signals from speed sensing means, and an hydraulic pump incorporating at least one plunger working in a bore controls brake re-application following skid correction.

In some known anti-skid braking systems of the kind set forth the wheel brake is connected to a reservoir to relieve brake pressure. In a second type a support chamber is connected to a reservoir. In a third type the wheel brake is connected to a low-pressure expansion chamber, and in a fourth type an hydraulic accumulator is connected to a chamber to push back against the master cylinder.

GB No. 2146080A discloses an anti-skid braking system of the kind set forth which can operate to relieve brakes without being connected to a reservoir or to a low pressure expansion chamber. In the specific constructions described the pump can be integral with the modulator assembly or separate from it, being connected to it by means of an external connection.

In the constructions of GB No. 2146080A, as the pump forces fluid back to the master cylinder when the brake is being re-applied, the forces on the pump can be considerable when the brake pedal is firmly loaded. This produces a cyclic torque which may generate a false signal at the speed sensing means. If the pump can be arranged to force fluid back to the brake and not to the master cylinder the torque build up will be gradual and the levels of pressure will be lower. With such an arrangement the generation of a false speed signal is reduced, so that it can be controlled by electronic filtering.

Ideally, therefore, the pump should act against brake pressure, and not against master cylinder pressure, but modulator assemblies of that type normally require a reservoir or a low-pressure expansion chamber.

According to one aspect of our invention in a vehicle anti-skid braking system of the kind set forth the pump plunger is of differential outline and works in a stepped bore, and each opposite side of the plunger defines between itself and the bore an annular chamber and a full pump chamber respectively, the annular chamber being pressurised by fluid at a pressure dependent on the difference in pressure between the master cylinder and the brake, and the full pump chamber being subjected to the pressure in the annular chamber in one direction and the pressure in the master cylinder in the opposite direction.

We therefore provide a pump which forces fluid back to the master cylinder but with torque levels similar to a pump which acts against brake pressure.

Conveniently the pump is connected to the modulator assembly, and the modulator assembly is provided with a first chamber connected to the brake, a second chamber connected to the master cylinder, a third chamber, and a valve movable in response to skid signals between a first position and a second position, in the first position during normal operation of the brake the valve isolates the third chamber from the second chamber, and in the second position when a skid signal is operative the valve permits fluid from the second chamber to be supplied to the third chamber whereby to render the pump operative to pump fluid from the third chamber into the second chamber to affect brake re-application following correction of the skid and following return movement of the valve into the first position at the termination of the skid signal.

The pressure in the third chamber, during brake re-application, is therefore substantially equal to the difference in pressures between the second chamber and the third chamber. Alternatively, stated another way, the pressure applied to the brake is substantially equal to the difference in pressures between the second chamber and the third chamber.

Preferably the annular pump chamber is connected to the third chamber and the full pump chamber is connected to the second chamber through a one-way valve.

Such an arrangement causes the pump to behave as if it were pumping back to the difference in pressures between the second chamber and the third chamber, namely the pressure applied to the brake.

This aspect of our invention therefore provides a vehicle anti-skid system which operates to relieve brakes without being connected to a reservoir or to a low pressure expansion chamber, and in which although the pump forces fluid back to the master cylinder when the brake is to be re-applied torque levels normally associated with systems in which a pump pumps fluid back to a brake, that is to say against brake pressure, are achieved.

In vehicle anti-skid braking systems of the kind set forth, when the vehicle comprises a motor cycle difficulty is experienced in mounting the modulator assembly and the pump on the cycle in such a position that the pump can be conveniently driven from the braked wheel, and the balance of the motor cycle is not affected substantially.

In a convenient installation the modulator assembly and the pump are mounted on the forks in which the wheel is rotatable, and the pump is driven from the wheel through a belt or other suitable transmission mechanism.

In another installation in which the speed sensing means comprises a flywheel mechanism, the flywheel mechanism is disposed within the hub of the wheel, and the pump is mounted on the forks outward of the wheel, the flywheel mechanism being installed within a casing which is rotatable with the wheel, and which is provided with an internal ring gear, both the flywheel mechanism and the pump being driven from the ring gear through suitable pinions.

According to another aspect of our invention, in a vehicle anti-skid braking system of the kind set forth, the vehicle comprises a motor cycle, and a unit incorporating the modulator assembly and the pump is installed within, and is driven by, the hub of the wheel adapted to be braked by the brake.

This provides a convenient installation and ensures that the balance of the motor cycle is maintained.

Conveniently the hub is provided with an internal ring gear from which the pump is driven by a drive gear.

When the speed sensing means comprises a flywheel mechanism, the flywheel mechanism is also incorporated in the unit installed within the hub, and the flywheel mechanism is also driven from the ring gear. In such a construction the ring gear meshes with an idler gear which, in turn, meshes with the drive gear.

Some embodiments of our invention are illustrated in the accompanying drawings in which.

The anti-skid braking systems illustrated in FIGS. 1-4 of the accompanying drawings are suitable for use in two and four wheel motor vehicles such as motor cars, vans, and motor cycles.

Figure 1:
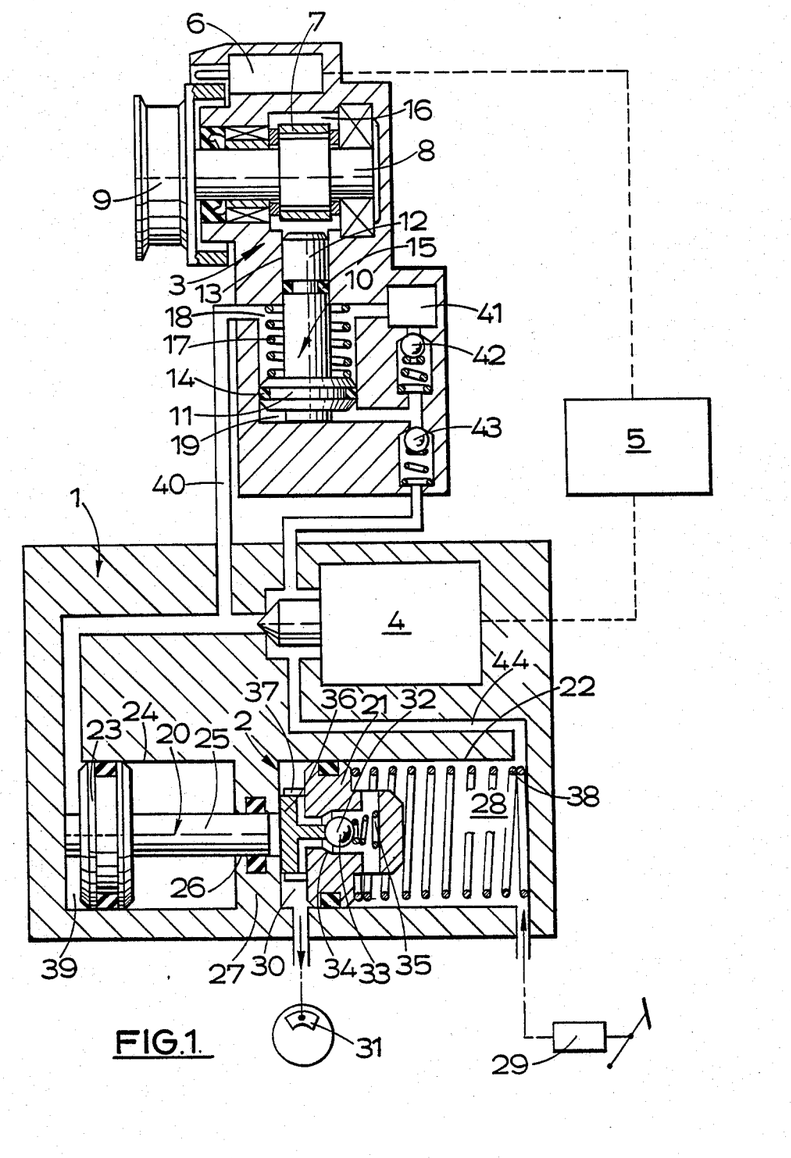
FIG. 1 is a schematic layout of a vehicle anti-skid braking system in a normal brake-applying mode.
Figure 2:
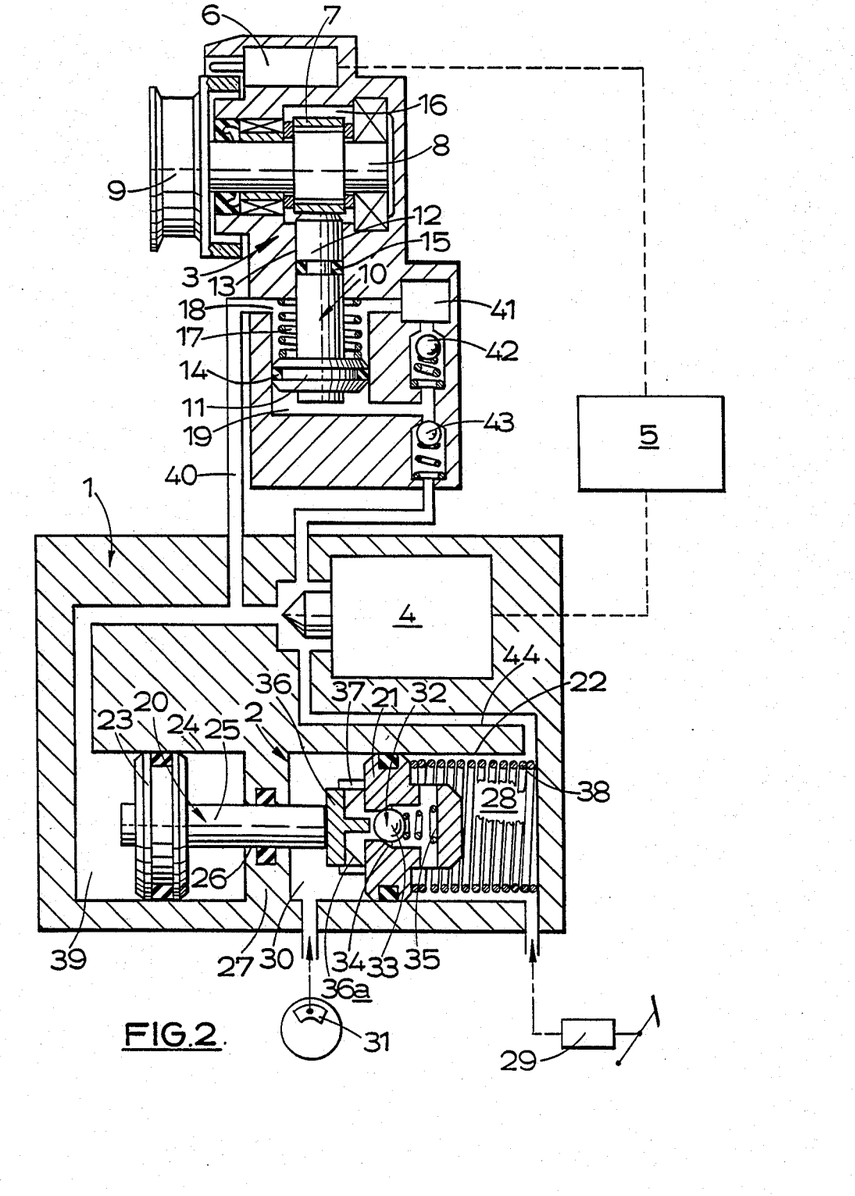
FIG. 2 is a schematic layout similar to FIG. 1 but showing the brake released in an anti-lock mode.
Figure 3:
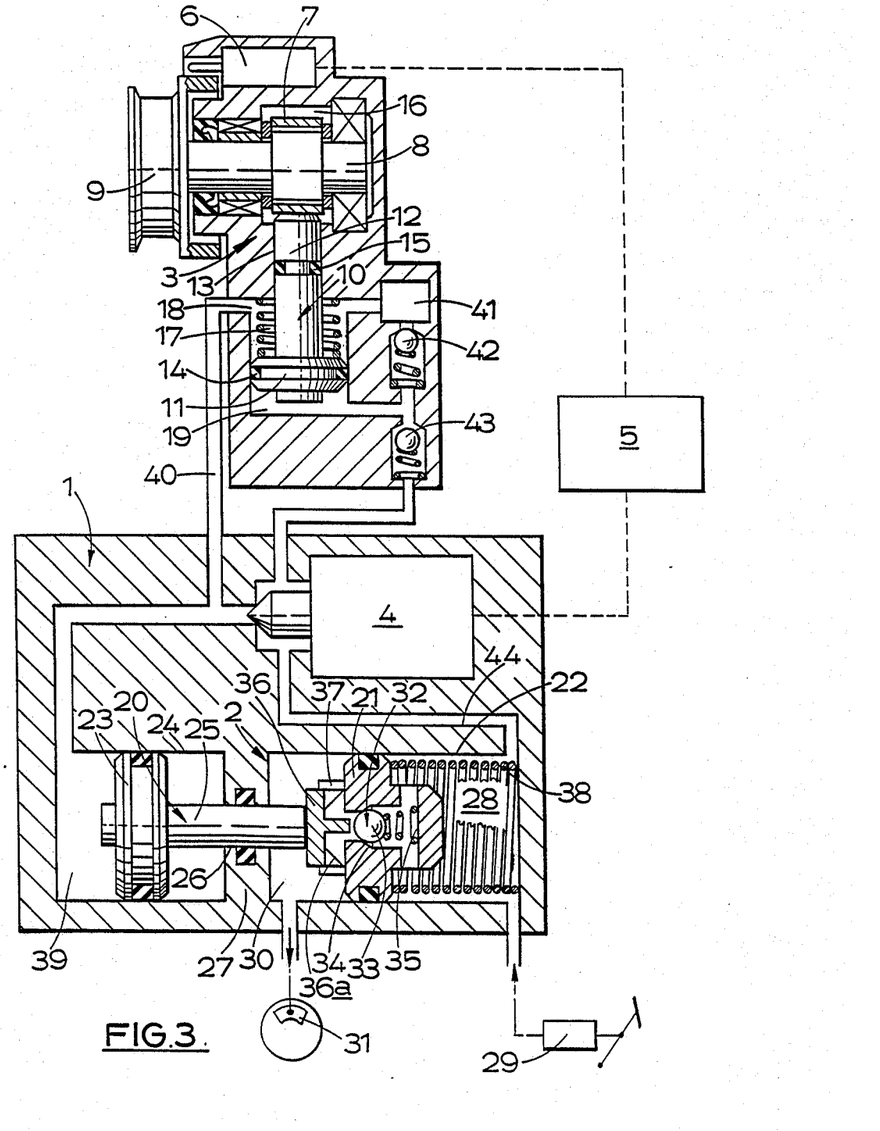
FIG. 3 is a schematic layout similar to FIGS. 1 and 2 showing the brake re-applied.

In the braking system shown in the layout of FIGS. 1-3, a housing 1 incorporates a modulator assembly 2, and hydraulic pump 3, and a solenoid-operated control valve 4 responsive to an energising current from an electronic controller 5 in turn responsive to signals from an anti-lock speed sensor 6, also incorporated within the housing 1.

The pump 3 comprises a eccentric 7 on a transverse shaft 8. The shaft 8 is driven from a drive shaft of a vehicle of the front wheel drive type through a belt and a pulley 9 which is fast with one end of the shaft 8. The sensor 6 senses the speed of rotation of the pulley 9. A pump plunger 10 of differential outline comprising a head 11 carried by a stem 12 works in a stepped bore 13 in the housing 1 and the head 11 and the stem 12 both carry seals 14 and 15 respectively. The stem 12 projects from the bore 13 into an atmospheric chamber 16 and is engageable with the eccentric 7 housed within that chamber 16. Normally the stem 12 is urged away from the eccentric by means of a compression spring 17. An annular chamber 18 is defined in the bore 13 between the head 11 and the stem 12 of the piston 10, and a full pump chamber 19 is defined between the head 19 and the inner end of the bore 13.

The modulator assembly 2 comprises a one-piece piston assembly 20 of generally dumb-bell outline working in a bore in the housing 1. The piston assembly 20 comprises a first modulator piston 21 working in a first portion 22 of the bore, a second modulator piston 23 working in a second portion 24 of the bore and of an area, which may be slightly larger than the piston 21, and a stem 25 integral with both pistons to hold them in a rigid spaced configuration and working in a bore portion 26 of a partition 27 which separates adjacent ends of the two bore portions 22 and 24.

A second chamber 28 defined between the piston 21 and the portion of the bore which is remote from the partition 27 is connected to a pedal-operated master cylinder 29, and a first chamber 30 between the piston 21 and the partition 27 is connected to a wheel brake 31. Communication between the second chamber 28 and the first chamber 30 is controlled by means of a one-way isolating valve 32. The one-way valve 32 comprises a valve member 33 which is normally urged towards a seating 34 in the piston 21 by means of a compression spring 35. In the retracted position shown in FIG. 1, the valve member 33 is held away from the seating 34 by a lost-motion probe member 36 which is slidably guided in a shroud 37 on the piston 21 and abuts against the partition 27 which defines a stop to determine the retracted position of the piston assembly 20 into which it is urged by means of a compression return spring 38. The probe member 36 is normally urged away from the piston 21 by means of a spring 36a.

A third chamber 39 is defined between the piston 23 and the portion 24 of the bore which is remote from the partition 27 is connected through a passage 40 to the annular chamber 18.

The annular chamber 18 is also connected to the full pump chamber 19 through a flow-control valve 41 and a first inlet one-way valve 42, and the full pump chamber 19, in turn, is connected to the second chamber 28 through a second outlet one-way valve 43, in series with the first valve 42, and a passage 44.

In a first closed position, the solenoid-operated valve 4 isolates the second chamber 28 from the third chamber 39 but when the solenoid of the valve 4 is energised in response to a skid signal, the valve 4 is moved into a second, open, position to interconnect the two chambers 28 and 39 by interconnecting the two passages 40 and 44.

In a normal inoperative position of the system the components are in the positions shown in FIG. 1 of the drawings.

When the pedal of the master cylinder, hydraulic fluid under pressure is supplied to the brake 31 through the second chamber 28 and the first chamber 30 which are in communication through the open isolating valve 32. Due to the presence of the second one-way valve 43 pressure fluid from the second chamber 28 cannot be supplied through the passage 44 to the full pump chamber 19. Since no skid signal is present, the solenoid-operated valve 4 is in its closed position, also to isolate the second chamber 28 from the third chamber 39.

If the vehicle passes onto a low friction surface with the brake 31 still applied and a skid signal is received, as shown in FIG. 2 of the drawings the speed sensor 6 indicates a severe wheel speed change to the electronic controller 5 and the solenoid valve 4 is energised by a current from the controller 5 to move into the second open position. This movement of the valve 4 into the second open position connects the master cylinder 29 to the third chamber 39, through the second chamber 28, and the two passages 44 and 40. Substantially equal pressures are then applied to opposite ends of the piston assembly 20 but, due to the presence of the stem 25 and the pressure in the first chamber 30, which is applied to the brake 31, the piston assembly 20 becomes unbalanced and moves in the bore in a direction against the loading in the spring 38. During the initial part of this movement the isolating valve 32 closes since, due to the loading of its spring 36a, the piston 21 moves relatively away from the probe member 36, further movement in the same direction expanding the effective volume of the first chamber 30 to relieve the pressure applied to the brake 31. At the same time as the valve 4 moves into its second, open, position, fluid flows through the passage 40 to the annular chamber 18 of the pump 3 and thence into the full pump chamber 19 through the flow control valve 41 and the first one-way valve 42.

The flow control valve 41 is of the kind forming the subject of our GB Pat. No. 2,045,372 and is included to regulate the flow of operating fluid to the pump 3 such that the output from the pump 3 is substantially constant throughout the wheel speed range, irrespective of the magnitude of the applied pressure at the inlet to the pump, namely that applied to the annular chamber 18.

Due to the difference in effective areas of the plunger 10 which define the chambers 18 and 19, the pressure in the chamber 19 overcomes the force in the spring 17 to urge the stem 12 into engagement with the rotating eccentric 7. The plunger 10 then oscillates to draw fluid from the third chamber 39 and deliver it to the master cylinder 29. Fluid is therefore pumped in a closed circuit and the piston assembly 20 is held in the position shown in FIG. 2 by pressure equivalent to pressure from the master cylinder 29 acting over the difference in the full effective areas of the two pistons 22 and 23.

When the wheel recovers and the skid signal decays, the solenoid-operated valve 4 returns to its closed position. As shown in FIG. 3 fluid drawn from the chamber 39 and then pumped back to the master cylinder 29 acts on the piston 21 to urge the piston 20 in the opposite direction. This reduces the effective volume of the chamber 30 whereby to re-apply the brake 31, with the isolating valve 32 remaining in the closed position due to the pressure in the chamber 28 acting over the area of the seating 34.

When the pump plunger 10 is forced away from the camshaft by the eccentric 7, the pump must generate sufficient force to overcome the pressure of the master cylinder 29 acting upon the full area of the plunger 10 minus the pressure in the third chamber 39 acting upon the annular area between the head 11 and the stem 12. Also the effective volume of the third chamber is decreased by the travel of the pump plunger 10 multiplied by volume of the said annular area of the plunger 10.

When the pump plunger 10 moves towards the eccentric 7, the fluid from the third chamber 39 is fed into the full pump chamber 19 via the flow control valve 41 and the first inlet one-way valve 42 as described above. The effective volume in the third chamber 39 is therefore decreased by the travel of the pump plunger 10 multiplied by the area of the stem 12. Thus the effective volume of the third chamber 39 is decreased during the movement of the pump plunger 10 in both directions, and the brake is therefore re-applied evenly.

Although the areas of the outer ends of the two pistons 21 and 23 are nominally equal, it is preferable to make the effective area of the piston 23 slightly larger. This will permit a low dump pressure in the brake, for icy conditions, and will allow for the frictions of seals carried by the pistons 21 and 23 and through which the stem 25 slides, and the force of the return spring 38.

If the brake pedal is pressed hard, whilst the vehicle is on a slippery surface, the pressures in the second chamber 28 and the third chamber 30 will rise. The brake pressure will be kept low by anti-lock operation as described above. As the pump 3 is assisted by the increase in pressure in the third chamber 39, the force on the pump plunger 10 required to pump back fluid to the master cylinder 29 is kept correspondingly low.

For example, if the area of the pump head 11 is 200mm$^2$ and the area of the stem 12 is 100mm$^2$ and the pressure of the master cylinder and the brake are 10 MN/m$^2$ and 2 MN/m$^2$ respectively, the pressure in the third chamber 39 is approximately equal to 8 MN/m$^2$. The force on the pump plunger 10 is therefore $10 \times 200 - 8 \times 100 = 1200$ N. Without the annular area between the head 11 and the stem 12 to assist, the pump force required would be $10 \times 200 = 2000$ N. Also by making the said annular area and the area of the stem 12 of the plunger 10 equal, the pump 3 delivers half its output in each direction. Without the said annular area the pump 3 would deliver in one direction only. Since the pump 3 has a stepped plunger 10, in operation, the said annular area is pressurised by fluid which is proportional to the difference in pressure between the pressure of the master cylinder 29 and the brake 31. The full area of the pump head 11 is subjected to the pressure in the said annular area in one direction and the pressure in the master cylinder 29 in the other.

Since the said annular area and area of the stem 12 are substantially the same, in operation, the pump delivery in one direction is equal to the travel of the plunger 10 multiplied by the area of the stem 12, and in the other direction to the travel of the plunger 10 multiplied by the said annular area. Thus for one revolution of the shaft 8, the output of the pump 3 comprises the travel of the plunger 10 multiplied by the full area of the head 11.

Figure 4:
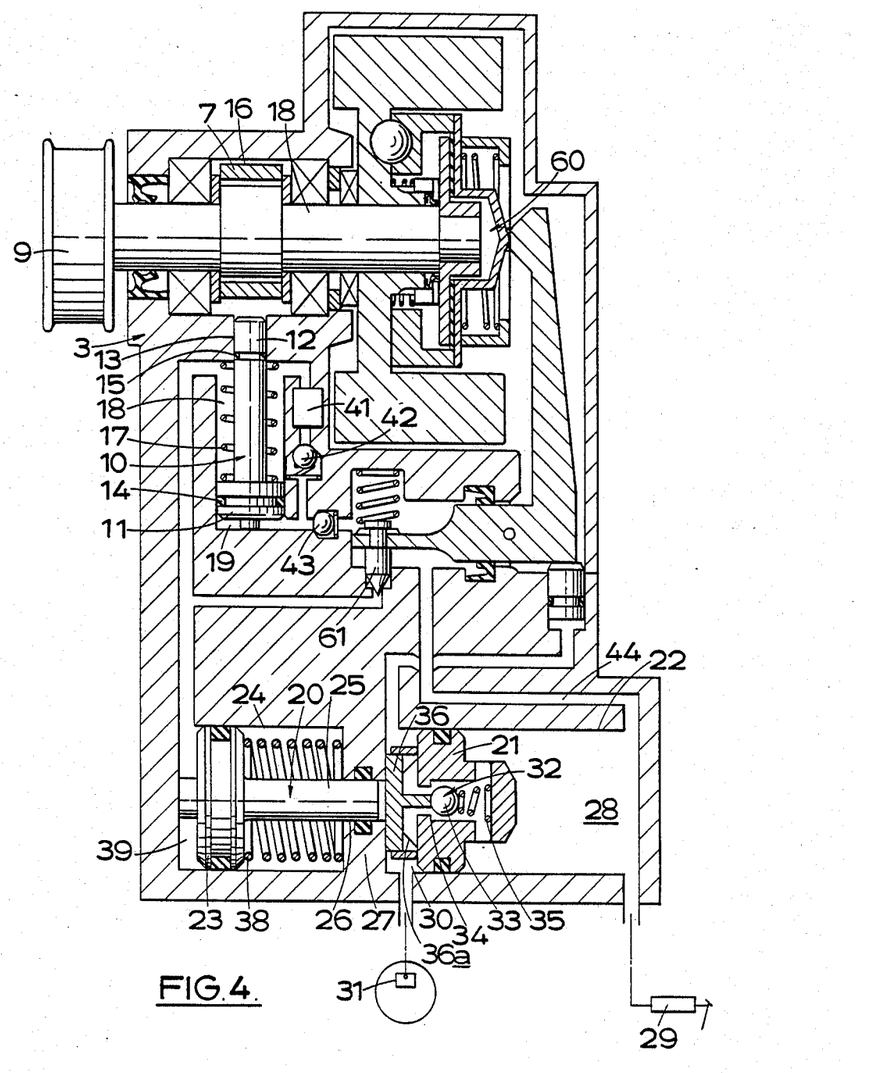
FIG. 4 is a schematic layout similar to FIG. 1 of a vehicle anti-skid braking system incorporating a difference skid sensing means.

In the braking system shown in the layout of FIG. 4 the speed sensor 6 and the controller 5 are omitted, and the solenoid-operated valve 4 is replaced by skid sensing means in the form of a flywheel mechanism 60 which is incorporated in the housing 1 and is driven, in a known manner, from the shaft 8 which is extended axially to form a suitable mounting for it. The flywheel mechanism may conveniently form the subject of our published British Patent Application No. 8506706 and need not be described further herein apart from stating that a valve 61 controlled by the flywheel mechanism operates in a similar manner to the valve controlled by the solenoid of the solenoid-operated valve 4 in the braking system of FIGS. 1–3.

Since the construction and operation of the system of FIG. 4 is otherwise the same as that of FIGS. 1–3 corresponding reference numerals have been applied to corresponding parts.

The units comprising the modulator assemblies 2 and the pumps 3 in the systems described above have the advantage that since no reservoir is required there are only inlet and outlet pipes connected to the housing 1 namely the connection from the master cylinder 29 and to the brake 31. This means that the unit is particularly suitable for installation is remote locations.

Figures 5, 6:
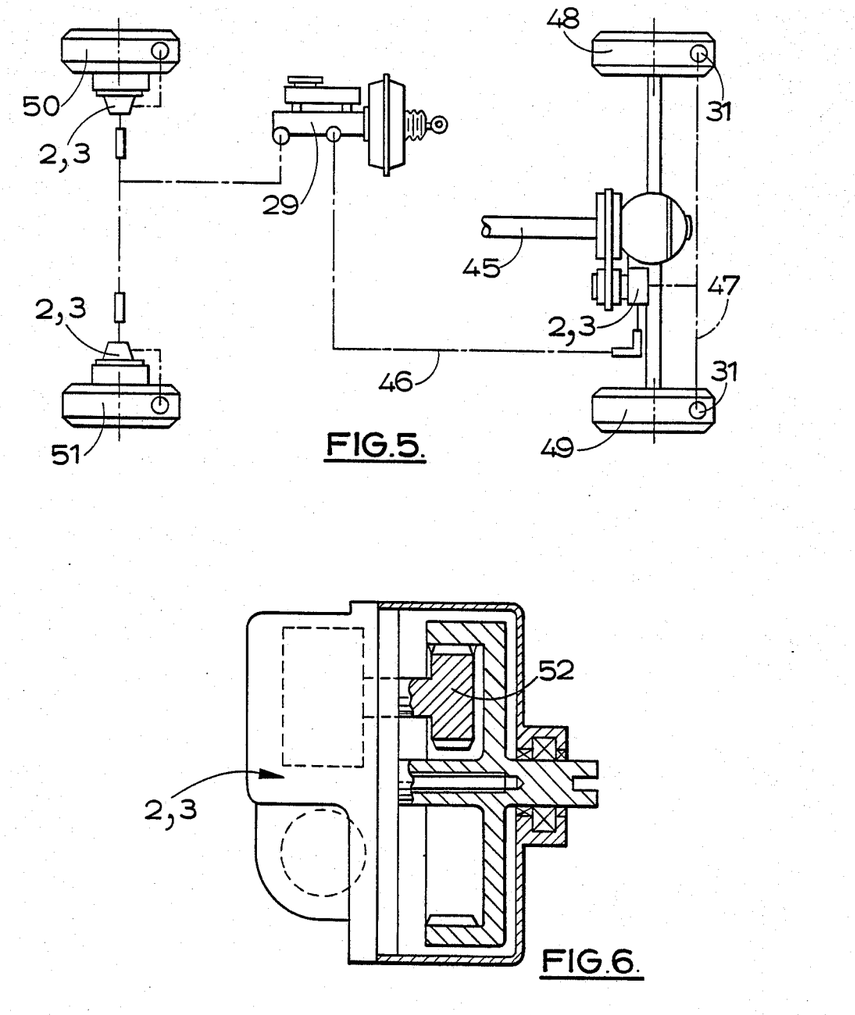
FIG. 5 is a schematic layout of an anti-skid braking system in a vehicle of the rear wheel drive type.
FIG. 6 is a sketch of a modulator assembly driven directly from a drive shaft not a road wheel.

For example, as shown in FIG. 5 of the drawings, when the unit 2, 3 is driven from the carden shaft 45 of a rear wheel drive car, an inlet pipe 46 from the master cylinder 29 and an outlet pipe 47 leading to the brakes 31 on the rear wheels 48, 49 need only pass into and out of the unit.

When the front wheels 50, 51 of the vehicle shown in FIG. 5 are both driven in addition to the rear wheels 50, 51 as shown in FIG. 6 it is possible to utilise the female axle housing of each front wheel 48, 49 to obtain direct drive 52, to a respective unit.

We are able, therefore, to obtain anti-lock control of all wheels of a four-wheeled drive vehicle very simply and cheaply.

For motor cycle installations in which the unit comprising the modulator assembly 2 and the pump 3 shown in the layout of FIG. 4 of the drawings is utilised, the unit is sufficiently small to fit into, and be driven by, an enlarged wheel hub.

Figure 7:
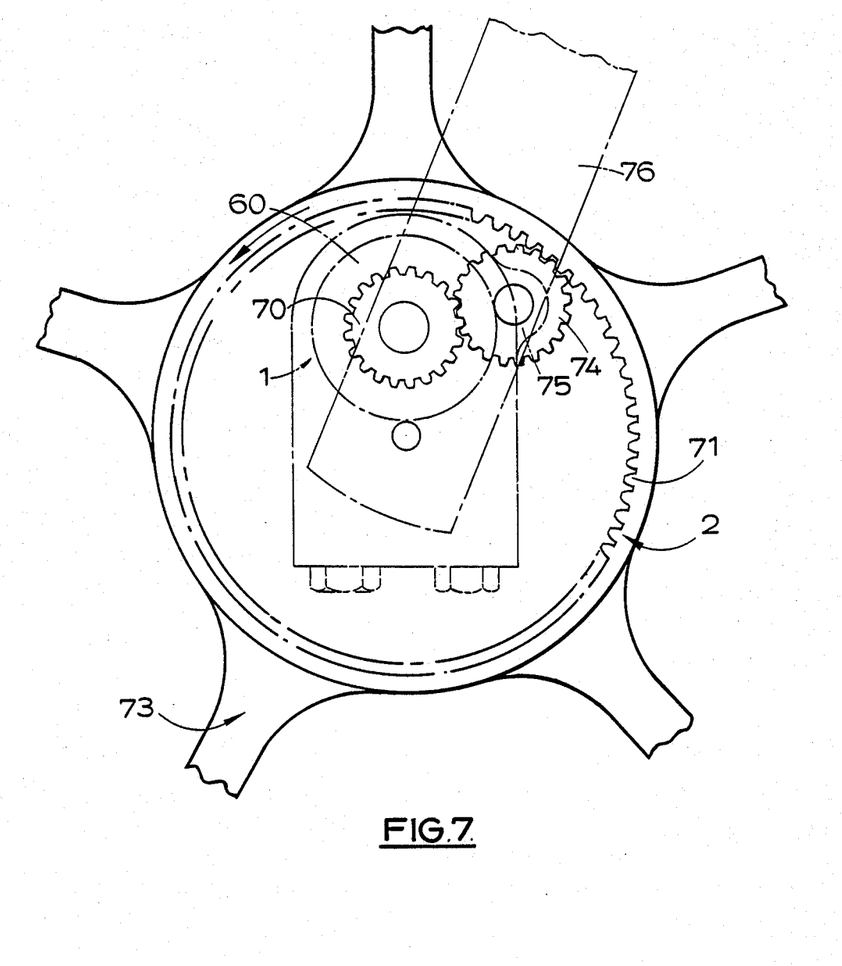
FIG. 7 shows a drive for a modulator assembly within the hub of the front wheel of a motor cycle.

As shown in FIG. 7 of the drawings the pulley 9 is replaced by a sprocket 70. The sprocket 70 is driven through a ring gear 71 on a hub 72 of a front wheel 73 of a motor cycle through an idler gear 74 and the idler gear 74, itself, is journalled for rotation on lug 75 on the housing 1. The unit can be mounted on an end closure plate for one end of the hub which, in turn, is connected to the inner face of one of the forks 76 of the pair between which the wheel is mounted for rotation.

In order to accommodate the unit in the hub with a flywheel mechanism 60 of maximum radial dimensions, the housing 1 is positioned as close as possible to the ring gear 71. This, in turn, makes it necessary for the pinion 70 to be driven from the ring gear 71 indirectly through the idler gear 74. The gear ratio between the sprocket 70 and the idler gear 74 is chosen to ensure that the flywheel mechanism is driven at the correct speed.

Such an installation is possible because the flywheel mechanism can be decreased in size since it opens against applied pressure applied to the brake, and because the modulator assembly does not require a support chamber or a reservoir connection.

I claim:

1. A vehicle anti-skid hydraulic braking system comprising a brake on a wheel, a master cylinder for supplying operating fluid to said brake to apply said brake, speed sensing means for sensing the speed of said wheel and for emitting skid signals, a modulator assembly for modulating the supply of operating fluid to said brake from said master cylinder, and an hydraulic pump for controlling re-application of said brake at the termination of a respective one of said skid signals, said hydraulic pump incorporating a bore, and at least one plunger working in said bore controls brake re-application following skid correction, wherein said vehicle comprises a motor cycle, said wheel has a hub, and said modulator assembly and said pump are incorporated in a unit, and wherein said unit is installed within said hub, and said hub is provided with an internal ring gear, and a drive gear drives said pump from said ring gear.

2. A system as claimed in claim 1, wherein said speed sensing means comprises a flywheel mechanism which is also incorporated in said unit, and drive means are also provided for driving said flywheel mechanism from said ring gear.

3. A system as claimed in claim 2, wherein said ring gear meshes with an idler gear which, in turn, meshes with said drive gear.

4. A system as claimed in claim 1, wherein said pump plunger is of differential outline and said bore is of stepped bore outline, said plunger being movable in said bore in first and second opposite directions and having first and second opposite faces of which said first face is of a larger effective area and said second face is of a smaller effective area, means defining a full pump chamber between said bore and said first face, means defining an annular chamber between said bore and said second face, means adapted to pressurise said annular chamber by fluid at a pressure dependent on the difference in pressure between said master cylinder and said brake, and means for subjecting said full pump chamber to pressure in said annular chamber in said first direction and to pressure in said master cylinder in said second direction.

5. A vehicle anti-skid hydraulic braking system comprising a brake on a wheel, a master cylinder for supplying operating fluid to said brake to apply said brake, speed sensing means for sensing the speed of said wheel and for emitting skid signals, a modulator assembly for modulating the supply of operating fluid to said brake from said master cylinder, and an hydraulic pump for controlling re-application of said brake at the termination of a respective one of said skid signals, said hydraulic pump incorporating a bore, and at least one plunger working in said bore controls brake re-application following skid correction, wherein said vehicle comprises a motor cycle, said wheel has a hub, and said modulator assembly and said pump are incorporated in a unit, and wherein said unit is installed within said hub, and said unit is mounted between said hub and a fork on said wheel, said hub having an internal ring gear driving an idler gear, said idler gear being journalled for rotation on a lug on said unit, and said idler gear driving said pump through a pinion.

* * * * *